Dec. 30, 1969 L. C. NICKELL ET AL 3,486,828
TRACK STRUCTURE FOR SENSING HEADS OF WEB WIDTH MONITOR APPARATUS
Filed June 30, 1967 4 Sheets-Sheet 1
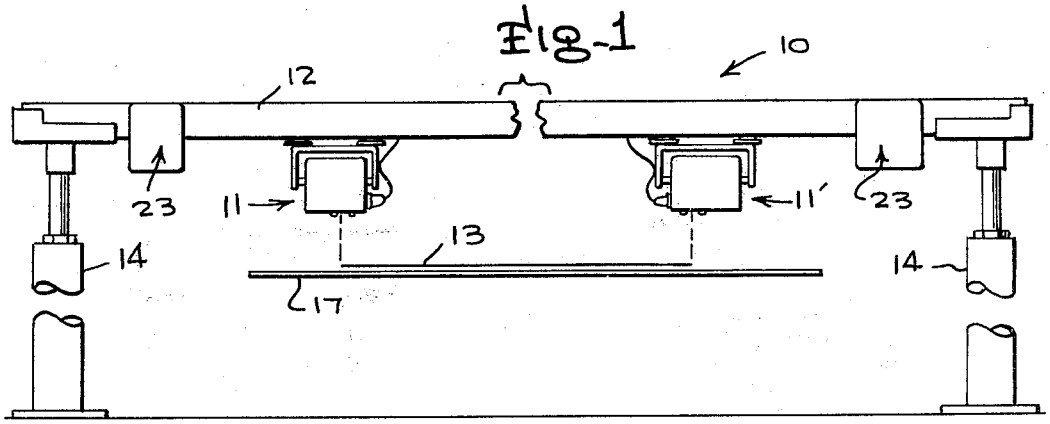
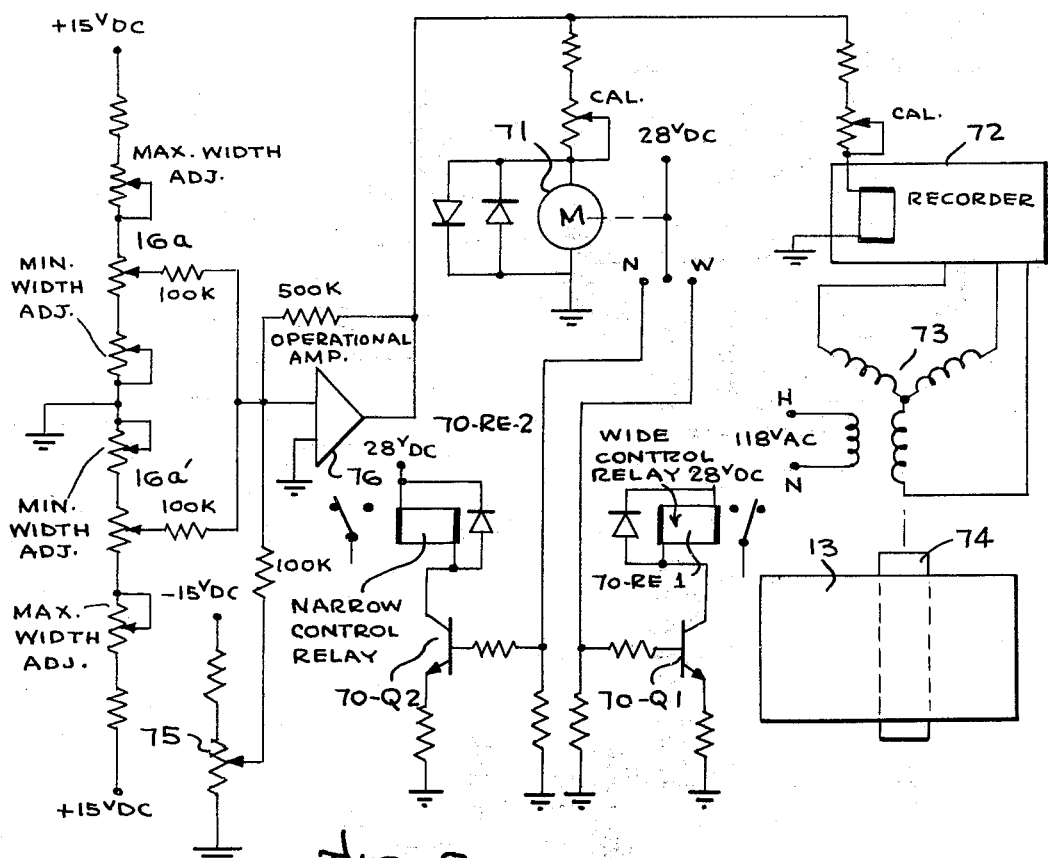
INVENTORS
LAWRENCE CREIGH NICKELL,
RAYMOND BAINES FERTIG,
HARRY R. SPENCE & HENRY T. SESSIONS
BY Mason, Fenwick & Lawrence
ATTORNEYS

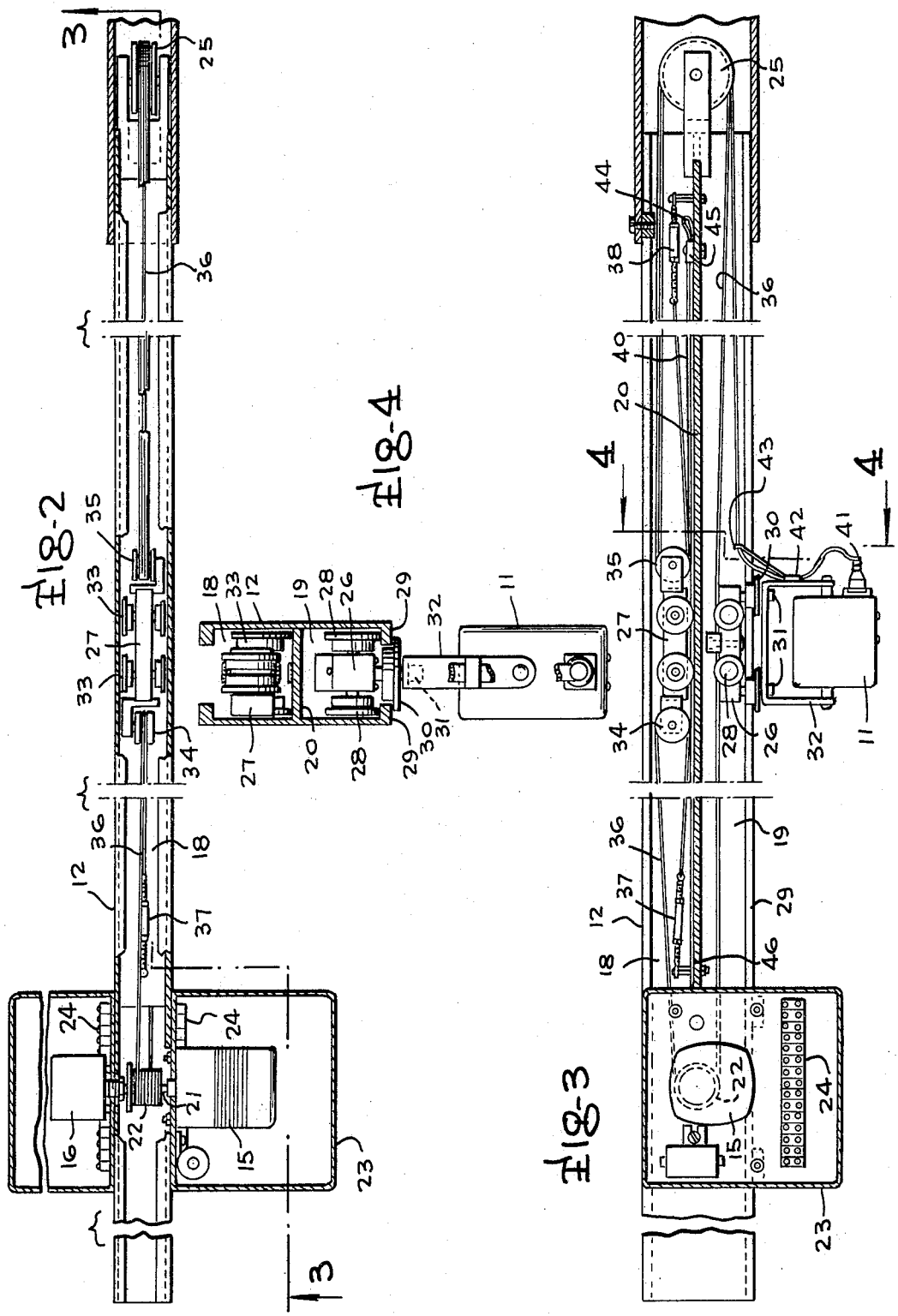

Dec. 30, 1969  L. C. NICKELL ET AL  3,486,828
TRACK STRUCTURE FOR SENSING HEADS OF WEB WIDTH MONITOR APPARATUS
Filed June 30, 1967  4 Sheets-Sheet 3

INVENTORS
LAWRENCE CREIGH NICKELL,
RAYMOND BAINES FERTIG,
HARRY R. SPENCE & HENRY T. SESSIONS
BY Mason, Fenwick & Lawrence
ATTORNEYS

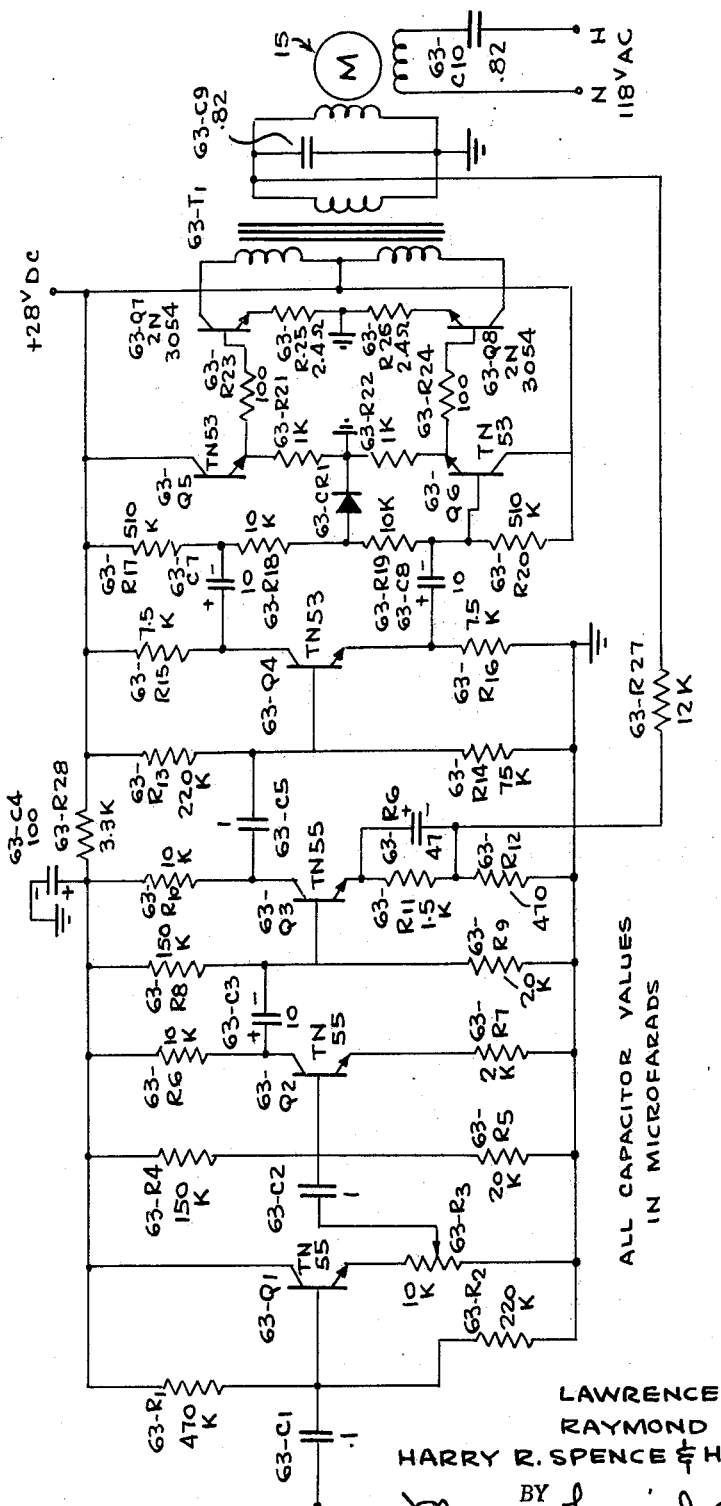

United States Patent Office 3,486,828
Patented Dec. 30, 1969

3,486,828
TRACK STRUCTURE FOR SENSING HEADS OF WEB WIDTH MONITOR APPARATUS
Lawrence Creigh Nickell, Raymond Baines Fertig, Harry Robert Spence, and Henry T. Sessions, Ronceverte, W. Va., assignors to Appalachian Electronic Instruments, Incorporated, Ronceverte, W. Va., a corporation of West Virginia
Filed June 30, 1967, Ser. No. 650,335
Int. Cl. G01n 21/18, 21/30
U.S. Cl. 356—199                                 9 Claims

ABSTRACT OF THE DISCLOSURE

A monitoring device for continuously measuring the width of a web as it moves along a transport path, including at least one sensing head located adjacent and above a lateral edge of the web to direct light in a selected pattern toward the web edge and photoelectrically sense the amount of returned light. The sensing head is carried by a trolley movable to-and-fro along an overhead rail, and is driven by servo motor means and a drive cable system responsive to electrical signals from a circuit activated by the photocell output from the sensing head. An electrical conductor extends along the rail from the servo motor means to the sensing head and is kept taut for all positions of the sensing head. The rail has a lower track section for the trolley and an upper track section for a roller carriage having pulleys for the drive cable and electrical conductor to maintain them in taut condition throughout movement of the sensing head. The sensing head has a cylindrical lens producing a line of light image at the web edge extending transversely of the web and substantially longitudinally centered on the web edge.

---

Figure 5:
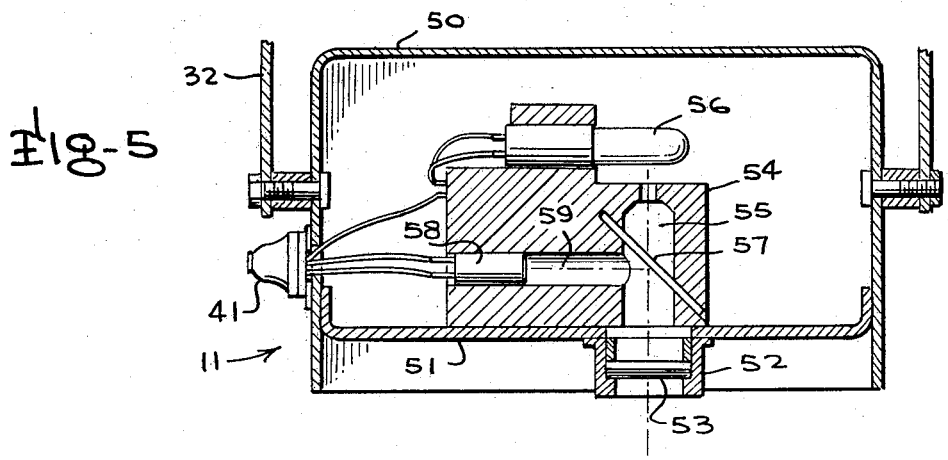

The present invention relates in general to devices for measuring the width of a moving web, and more particularly to web width monitoring devices involving a pair of optical sensing units electronically servo controlled in conjunction with each other to provide non-contacting measuring and indicating of the position of the edges of a continuously moving web, sheet or film of material.

Many web width measuring devices heretofore available are limited in application by their nature to particular kinds of web material. Some of such devices operate only on opaque web materials, some operate in response to highly reflective web materials, and others operate on transparent web materials, or in response to the reflectivity of backing rollers which support the material, while others are specifically designed to sense special types of fabrics, such as woven screen wire or knitted fabric webs. However, such devices are customarily quite limited in their application, due to the optical properties or mechanical or electrical nature of the system. Many of such devices are quite limited in the range of variation of web widths which can be measured by the device and frequently lose control of the sensing units when the web width varies outside a very narrow range of widths which the optical system can monitor.

Further, when the systems involve a pair of sensing units which are moved along a preselected track or axis transversely of the web in accordance with variations in the location of the web edges, severe problems arise in regard to the provision of appropriate supporting, guiding and driving structure for the moving sensing units along with the necessary electrical connections between the moving sensing heads and the stationary circuitry which responds to the electrical signals produced by the sensing heads.

An object of the present invention, therefore, is the provision of an improved non-contacting web width monitor adapted to continuously measure the width of webs moving along a web transport path.

Another object of the present invention is the provision of a novel non-contacting web width monitor wherein a pair of optical sensing units are supported by a novel supporting rail structure for relative convergent and divergent movement along a rectilinear axis transverse of the web feed path.

Another object of the present invention is the provision of a novel non-contacting web width monitor having an optical system for sensing the location of the lateral edges of the moving web in a manner whereby the movable sensing heads are continuously maintained under reliable automatic control responsive to changes in position of the web edges through wide variations in web widths.

Yet another object of the present invention is the provision of a novel non-contacting web width monitor employing retro-reflective material beneath the lateral edges of the web and optical means producing images at the web edge zone which are elongated in a direction transverse to the direction of web travel over a substantial width to provide improved control and web width monitoring properties.

Other objects, advantages and capabilities of the present invention will become apparent from the following detailed description, taken in conjunction with the accompanying drawings illustrating a preferred embodiment of the invention.

Figure 6:
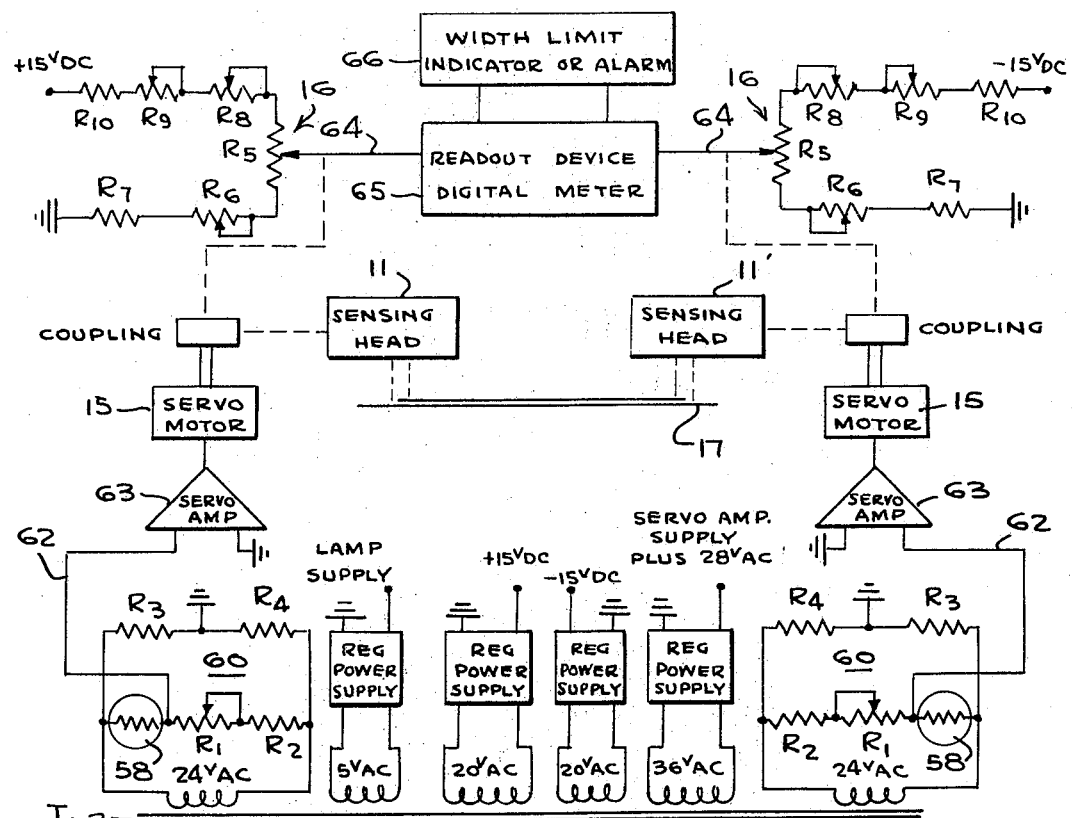

In the drawings:
FIGURE 1 is a somewhat diagrammatic, front elevation view of the web width monitor system of the present invention;
FIGURE 2 is a fragmentary top plan view of approximately the left hand half of the web width monitor assembly, with parts broken away to reveal the interior structure thereof;
FIGURE 3 is a vertical longitudinal section view through the supporting rail and illustrating one of the sensing heads therealong, taken along the line 3—3 of FIGURE 2;
FIGURE 4 is a vertical transverse section view taken along the line 4—4 of FIGURE 3;
FIGURE 5 is a vertical longitudinal section view through one of the sensing head units, illustrating one form of sensing head structure usable with the web width monitor assembly of the present invention;
FIGURE 6 is a block diagram of the electrical circuitry of the web width monitor system, with certain parts shown schematically;
FIGURE 7 is an electrical schematic diagram of the servo amplifier employed in the web width monitor, and
FIGURE 8 is a schematic diagram of a meter-recorder readout circuit which may be used with the web width monitor.

Referring to the drawings, wherein like reference characters designate corresponding parts throughout the several figures, a typical mechanical arrangement of the web width monitor system of the present invention is illustrated generally in FIGURE 1, designated by the reference character 10. As there shown, the system generally comprises a pair of movable sensing heads 11, 11', movably supported from an elongated rail or channel 12 for rectilinear reciprocative movement above the respective lateral edges of a moving web 13 along an axis arranged transversely of the direction of movement of the web. The supporting rail 12 is supported in any conventional manner above and transversely spanning the web 13 at a selected web inspection station by any conventional means, such, for example, as by a pair of vertical posts or stanchions 14 fixed to and rising from any desired fixed surface, such, for example, as the floor of the room through which the web is traveling, or a machine or conveyor frame. The system also includes a servo motor 15 and a servo potentiometer or position indicating device 16, associated with each of the respective sensing heads 11, 11', the servo motor 15 and servo potentiometer 16 for each sensing head being conveniently incorporated in the structure of the rail 12 in the illustrated embodiment, for example, adjacent the outermost end of the rail.

Each of the sensing heads 11, 11', as will be more fully described hereinafter, projects light from a light source incorporated in the sensing head through a cylindrical lens along a diverging set of incident light ray paths lying substantially in a single plane toward the adjacent edge portion of the path of web travel to produce an elongated line of light image elongated in a direction transversely of the direction of web travel at the web plane, the longitudinal center of the line of light image being located substantially at the lateral edge of the web. Immediately beneath the web 13 and spanning a transverse distance somewhat wider than the web 13 is a retro-reflective backing or tape 17 disposed in the path of the incident light rays produced by the sensing heads 11, 11'. The arrangement is such that the light rays striking the retro-reflective tape 17 beyond the edge of the web 13 and the light rays striking the web in the zone of the line of light image produced thereby will be retro-reflected or returned to the sensing head and sensed by a photoelectric cell or other conventional photoelectric means incorporated in each of the sensing heads, causing them to have a certain resistance value, depending upon the proportions of the line of light image falling on the web and falling on the retro-reflective tape. If the edge of the web 13 moves in a direction to occupy more than half of the longitudinal extent of the line of light image directed toward that edge of the web, more of the incident beam of light falls on the web and less light is reflected to the photoelectric cell of the associated sensing head, increasing the resistance of the photoelectric cell. If the web edge moves in a direction to occupy less than half of the longitudinal extent of the line of light image, a greater amount of light is retro-reflected to the photoelectric cell, producing a decrease in the resistance of the photoelectric cell. The photoelectric cells are connected by means to be later described in detail with a control amplifier controlling the servo motor 15 for each of the respective sensing heads, to cause the associated servo motor 15 to be driven in a direction to move the associated sensing head along the rail 12 in a direction to again cause the correct proportion of the incident light beam to be reflected to the photocell. The servo potentiometer 16 is also coupled to the servo motor 15 associated with each of the respective sensing heads calibrated in relation to sensing head positions along the rail to continuously indicate the width of the web.

The portions of the supporting rail 12 associated with each of the respective sensing heads 11, 11' are of special construction and are provided with multiple trolleys associated with drive cables and electrical conductors in a special arrangement for supporting and driving the associated sensing head and tending the electrical leads extending to the sensing head to maintain the drive cable and electrical leads extending between the moving sensing head and stationary circuitry associated therewith in predetermined paths so that they will not interfere with each other or with proper movement of the sensing head. In the illustrated example, the width monitor is formed of two like sensing unit sub-systems arranged symmetrically with respect to the transverse center of the web path, or with respect to the longitudinal center of the rail 12, so that description of the rail structure and associated components of the system lying to one side of the center of the web path will suffice. As more clearly appears from FIGURES 2 and 3, the supporting rail or channel 12 is formed into two, vertically spaced compartments 18, 19 by a central horizontal divider partition 20 extending from a point near the longitudinal center of the rail 12 to a position adjacent an end of the rail. The associated servo motor 15, which is of the conventional commercially available type, and the servo potentiometer 16, are disposed in coaxial relation at opposite sides of the rail 12 near the end thereof, with the shaft 21 of servo motor 15 coupled by a conventional flexible coupling to the shaft of the servo potentiometer 16 and supporting a cable drum 22 to be driven thereby, having its axis of rotation located substantially in the extended plane of the partition 20, for example, in a cut-out in partition 20 or adjacent the end of the partition nearest the end of the rail 12. The servo motor 15 and servo potentiometer 16 are, in the illustrated embodiment, housed in a suitable casing 23, which also houses electrical terminal strips indicated generally at 24. A grooved idler pulley 25 is mounted within the rail 12 adjacent the center thereof, spaced slightly from the end of the partition 20 nearest the center of the rail 12, with its axis of rotation also located substantially in the extended plane of the partition 20.

A pair of wheeled trolleys 26 and 27 are located within the respective compartments 18, 19 of the rail 12 for movably supporting the associated sensing head, for example, the sensing head 11, and to provide for proper operation of drive cable means and electrical leads associated with the sensing head 11. The lower trolley 26 tracks in the lower compartment 19 of the rail 12, and comprises a pair or set of flanged trolley wheels 28 supported for rotation on horizontal axes and bearing on the bottom flanges 29 of the rail 12 and a pair of stabilizing flange wheels 30 journaled on depending vertical bolts or axle members 31 to track on the confronting vertical edge surfaces of the bottom flanges 29 or rail 12. A mounting bracket 32, here shown as an inverted U-shaped strap, is mounted on the lower trolley 26 by the bolts 31 and supports the associated sensing head 11 by suitable supporting means extending from the sensing head 11 to the depending legs of the mounting bracket 32. This trolley construction supports the sensing head 11 in proper alignment with minimum lateral or vertical motion. The upper trolley 27 tracks in the upper compartment 18 of the rail 12, and includes flanged wheels 33 supported for rotation on horizontal axes and tracking on the partition 20, and has a pair of pulleys 34, 35 at the opposite ends thereof journaled for rotation about horizontal axes.

The drive means for the sensing head supporting trolley 26 is formed of a single drive cable 36, which is anchored to the driving drum 22 at a convenient location to provide positive, as opposed to friction, drive of the cable. The periphery of the cable drum 22 is threaded or grooved with suitable threads, in which the drive cable 36 is trained, to provide a controlled cable lay of uniform diameter to insure essentially constant speed of the associated sensing head 11. The drum diameter, travel distance of the sensing head, and servo motor speed are coordinated to provide a "fleet angle" or angle of approach of the cable 36 to the drum 22, at the extremes of sensing head movement, which is compatible with maximum cable life and minimum speed differential incurred by the rate change introduced by the continually changing "fleet angle." The portion of the drive cable 36 feeding from the top of the drum 22 extends through the upper rail compartment 18 to the pulley 34 on the left hand end of the upper trolley 27 (as viewed in FIGURE 3), the pulley 34 being a single groove pulley, and the cable returns back to the vicinity of the drum 22 where it is anchored to the partition 20 by a turn buckle, spring anchoring assembly 37. This provides tension adjustment for the drive mechanism. That portion of the drive cable 36 feeding from the bottom of the drum 22 extends through the lower rail compartment 19 to the pulley 25 adjacent the center of the rail 12. The cable 36 is trained about the pulley 25 and extends back through the upper rail compartment 18, where it is trained about the pulley 35 on the upper trolley 27, which is a dual grooved pulley, and is fed back to the vicinity of the pulley 25 and anchored to the partition 20 through a turn buckle 38 for additional tension adjustment. The lower trolley 26 is provided with a suitable clamping block or similar clamping means 39, through which the lower portion of the drive cable 36 extends, which is clamped to the drive cable 36 at a position therealong, locating the lower trolley 26 at the center of its travel when the upper trolley 27 is at the center of its travel.

The electrical cable supplying the electrical connections between the sensing head 11 and the stationary circuitry is indicated generally by the reference character 40 and is of the flexible, multi-conductor ribbon type in the preferred example. It is connected at one end to the associated sensing head, for example, the sensing head 11, by a conventional miniature connector 41 and clamped, as indicated at 42, by conventional clamping means to the sensing head carriage bracket 32. The cable 40 is supported in the lower rail compartment 19 by a conventional spring clip 43 which permits only a minimum of tension to be applied to the conductors in the cable. The cable 40 is fed from the spring clip 43 through the lower compartment 19 of the rail 12 around the pulley 25 near the center of the rail 12 and into the upper rail compartment 18. There the cable 40 is kept separate from the drive cable 36 to eliminate possible abrasion and is fed to the dual grooved pulley 35 on the right hand end of the upper trolley 27, where it is trained around this pulley and back to the vicinity of the pulley 25. There it is doubled over, as indicated at 44, so that the free end of the cable is on the bottom, adjacent to the partition 20, and is attached to the partition by a suitable clamp 45. The free end of the electrical cable 40 extending from the clamp 45 is laid down along the partition 20 and fed back to the drive end of the rail 12, along a path centered under the upper trolley 27. Near the anchor position of the drive cable 36, the electrical cable 40 is anchored to the partition 20, as indicated at 46, near the axis of the rail and is fed from there through a suitable grommeted hole into the casing 23, where connection is made to an appropriate terminal of the terminal strip 24.

The above-described drive cable and electrical cable arrangement provides a positive drive with multiple adjustments for position, tension and motion. If the servo motor 15 is driven in a clockwise direction, as viewed in FIGURE 2, it will be apparent that the lower leg of the drive cable 36 within the lower rail compartment 19 will be drawn to the left due to the clockwise rotation of the drive drum 22, drawing the lower trolley 26 and the sensing head 11, supported thereby, to the left and drawing the upper trolley 27 a corresponding or related distance to the right, due to the consequent shortening of the length of drive cable in the upper compartment 18, extending between the pulley 25 about the pulley 35 and to the anchor turnbuckle 38. Appropriate lengthening of the portion of the electrical cable 40 extending from the pulley 25 through the lower compartment 19 to the sensing head 11, is also achieved by the movement to the right of the upper trolley 27, thus shortening the distance between the upper trolley pulley 35 and the anchored bend 44 in the electrical cable. Movement of the servo motor 15 in the opposite or counter-clockwise direction effects opposite action in the sense that the length of the drive cable 36, between the anchoring turnbuckle 37 and the upper trolley pulley 34, is shortened, the opposite end portion of the drive cable 36, extending between the anchoring turnbuckle 38 and upper trolley pulley 35, is lengthened, thus drawing the drive cable portions lying within the lower compartment 19 to the right and consequently shifting the scanning head 11 to the right an appropriate distance. The electrical cable 40 is maintained in appropriately tensioned condition in a manner similar to the described earlier, due to the movement of the trolley 27 and its pulley 35 about which a portion of the electrical cable 40 is trained.

Each of the sensing heads 11, 11' may be of the same construction as that disclosed in the copending application Ser. No. 417,697, filed by Lawrence Creigh Nickell and Raymond Baines Fertig on Dec. 11, 1964, now Patent No. 3,345,835. The structure of the sensing head 11 of the herein-disclosed embodiment is illustrated diagrammatically in FIGURE 5 and comprises, for example, a substantially box-like casing 50 supporting a mounting panel or plate 51 near the lower region thereof, provided with a suitable opening and a lens mounting tube 52 in alignment with the opening in which is disposed a plano-convex cylindrical lens 53 arranged with its axis of curvature, and the line of light image produced thereby, extending perpendicular to the direction of web travel and therefore extending transversely of the web. Mounted on the panel 51 and located within the casing 50 is a mounting block 54 having a bore 55 extending therein along the principal optical axis of the lens 53, providing a masking aperture of small diameter at its upper end forming a substantially point light source. A lamp 56 is supported in the block 54 with its filament aligned above the masking aperture of the bore 55, producing light which is projected from the point light source formed by the masking aperture through the cylindrical lens 53 to the plane of the web 13 with the incident light rays traveling along divergent paths from the point source and lying in substantially the center plane of the lens 53 to produce an elongated line of light image whose longitudinal center occurs at the adjacent lateral edge of the web. A semi-transparent mirror 57 is located at an appropriate angle within the bore 55 to transmit the incident light rays from the lamp 56 through the lens 53 to the web region, and to reflect light returning to the lens from the web region substantially along the incident ray paths to a photocell 58, for example, housed in a branch bore 59, extending at right angles to the axis of the bore 55. Since the retro-reflective material constituting the reflective tape 17 is of the type which retro-reflects light back along the incident ray paths, being formed from material such as Scotch Lite or similar material, the light rays forming the portions of the line of light image which lie laterally outwardly from the edge of the web 13 are retro-reflected by the tape 17 back through the lens 53 and are reflected by the semi-transparent mirror 57 to the photocell 58 to activate the photocell and vary the resistance thereof in accordance with the amount of the return light.

Referring now to the electrical circuitry illustrated in FIGURE 6, the photocell 58 for each of the sensing heads 11, 11' respectively form part of a null bridge arrangement, indicated generally by the reference character 60, having a zero potentiometer R1 and resistor R2 in series with the photocell 58 collectively connected across 24 volt alternating current secondary windings 61 of a transformer T1. Resistors R3 and R4 are connected together in series and collectively connected across the photocell 58 and resistors R1 and R2 to form the other leg of the bridge. The center point between the resistors R3 and R4 is connected to ground and the junction between photocell 58 and resistor R1 is connected by lead 62 to the input of a servo amplifier 63, a schematic circuit of which is illustrated in FIGURE 7.

Likewise, the position indicating device or servo potentiometer 16 is illustrated schematically in FIGURE 6, and comprises the potentiometer R5 whose slider contact or wiper is mechanically linked, for example, by a flexible coupling, with the output shaft 21 of the servo motor 15. One end of the servo potentiometer R5 is connected through minimum width adjustment resistor R6 and fixed resistor R7 to ground, and the other end of the potentiometer R5 is connected through maximum width adjustment resistor R8, range adjustment resistor R9 and fixed resistor R10 to a source of DC voltage of selected level, for example, 15 volts DC. The sliding contact or wiper of the servo potentiometer R5 is connected through lead 64 to one side of a digital read-out device or meter 65 of conventional construction designed to apply a voltage thereto along lead 64 bearing a direct relationship to the linear position of the associated sensing head to convert this voltage to a direct indication of linear position of the sensing head. This read-out device 65 may be a meter properly calibrated to give visual indication by needle position, a digital voltmeter, or any suitable device for converting the voltage to an indication of position. A width limit indicator or alarm 66 may also be connected to the digital read-out device 65, having a relay associated with high and low control set points in the read-out device 65 to respond to movement of the edge of the web 13 beyond set limits and operate an alarm or stop motion.

In the dual position sensing system herein specifically described, employing the two sensing heads 11, 11' to sense the respective lateral edges of the web 13, the subsystem lying to each side of the center of the rail 12 are identical mechanically and electrically except for the polarity of the voltage applied across the position indicating read-out device or meter 65. The amplifiers 63 are phase sensitive, so as to apply correction voltages to the servo motors 15 in a proper sense to drive the respective sensing heads to positions properly centering the line of light image produced thereby on the related edge of the web, the difference in polarity of the voltages applied to the read-out device 65 being obtained by applying one polarity of DC voltage, for example, +15 volts DC, to the left servo potentiometer R5 and its associated resistors and applying an opposite polarity, for example, −15 volts DC, to the right servo potentiometer R5 and its associated resistors. This applies negative and positive voltages from the left and right hand servo potentiometers to the digital read-out device 65.

It will be apparent from the above description that the photocell 58 in each of the sensing heads 11, 11' forms one leg of its associated bridge 60, which forms the input to the associated servo amplifier 63. The balance or zero adjustment potentiometer R1 of each bridge 60 allows compensation for variance in photocell parameters when nulling the bridge and, within limits, selection of the null position of the associated sensing head.

An example of a servo amplifier circuit which may be used with the web width monitor is shown schematically in FIGURE 7, which illustrates a conventional low frequency AC coupled amplifier using AC feedback to lower its output impedance, in order to secure proper damping of the servo motor 15. It amplifies the 60 c.p.s. error signal from the photocell bridge 60 and brings it up to a level sufficient to drive the two phase servo motor 15.

The error signal from the photocell bridge 60 is coupled to the base of transistor 63–Q1 by capacitor 63–C1. A voltage divider consisting of resistor 63–R1 and 63–R2 is used to forward bias 63–Q1. Potentiometer 63–R3 is the emitter load resistor for 63–Q1 and also the gain control for the amplifier. 63–Q1, being connected as an emitter follower, has a voltage gain of slightly less than one, a high input impedance and a low output impedance. The AC voltage from the slider of 63–R3 is coupled to the base of transistor 63–Q2 by capacitor 63–C2. A voltage divider consisting of 63–R4 and 63–R5 provides forward bias for 63–Q2. Resistor 63–R6 is the collector load resistor, while resistor 63–R7 is the emitter bias resistor for 63–Q2. 63–R7 provides both DC and AC stabilization, since it is unbypassed. The amplified AC signal appearing across 63–R6 is coupled to the base of 63–Q3 by capacitor 63–C3. A voltage divider consisting of 63–R8 and 63–R9 provides forward bias for 63–Q3. Resistor 63–R10 is the collector load resistor for 63–Q3, while resistors 63–R11 and 63–R12 are in the emitter of 63–Q3 to provide DC stabilization and to provide overall AC feedback for the last four stages of the amplifier. Capacitor 63–C6 is used to bypass 63–R11 to eliminate degeneration in order to prevent loss of gain in 63–Q3. Since 63–Q3 is in the overall feedback loop, it is desirable for it to have high gain. The amplified signal appearing across 63–R10 is coupled by capacitor 63–C5 to the base of transistor 63–Q4. A voltage divider consisting of resistors 63–R13 and 63–R14 provides forward bias for transistor 63–Q4. 63–Q4 is a split load phase inverter having a gain of about two. Resistor 63–R15 is the collector load resistor, while 63–R16 is the emitter load resistor for 63–Q4. Signals of about equal amplitude appear across 63–R15 and 63–R16. However, the signal across 63–R15 is 180° out of phase with the base signal and the signal across 63–R16. The signal appearing across 63–R15 is coupled to the base of transistor 63–Q5 by capacitor 63–C7, while the signal appearing across 63–R16 is coupled to the base of transistor 63–Q6 by capacitor 63–C8. A voltage divider consisting of resistors 63–R17 and 63–R18 is used to forward bias transistor 63–Q5, while a similar network consisting of resistors 63–R19 and 63–R20 is used to forward bias transistor 63–Q6. A diode 63–CR1 is used for bias temperature compensation and is common to both bias dividers. Since a silicon diode has a negative temperature coefficient, the forward bias on both 63–Q5 and 63–Q6 will decrease with temperature thus tending to prevent 63–Q5 and 63–Q6 from drawing more current due to an increase in beta with temperature. Resistor 63–R21 is the emitter load resistor for transistor 63–Q5, while resistor 63–R22 is the emitter load resistor for 63–Q6. 63–Q5 and 63–Q6, being connected as emitter followers, have a low output impedance suitable for driving the two output power transistors 63–Q7 and 63–Q8. The signal appearing across 63–R21 is coupled to the base of 63–Q7 by resistor 63–R23, a current limiting resistor and the signal appearing across 63–R22 is coupled to the base of 63–Q8 by resistor 63–R24 for the same purpose. Forward bias for 63–Q7 and 63–Q8 is also supplied by resistors 63–R23 and 63–R24 from the emitters of 63–Q5 and 63–Q6. The power output stage consists of 63–Q7 and 63–Q8, transformer coupled by 63–T1 to the servo motor 15. The collector load for 63–Q7 is one-half of the primary of 63–T1, while the collector load for 63–Q8 is the other half of the primary of 63–T1. Resistor 63–R25 is the emitter bias resistor for 63–Q7, while 63–R26 is the emitter bias resistor for 63–Q8. These resistors provide both DC and AC feedback for stabilizing 63–Q7 and 63–Q8. 63–T1 is a step up transformer having a ratio of about 1 to 5 for raising the voltage across the primary from about 25 v. AC to 118 v. AC across the secondary which is the voltage required by the control winding for full speed operation of the servo motor. Capacitor 63–C9 is used to tune the control winding of the servo motor to a near resonance condition which raises the impedance seen by output transformer 63–T1. Capacitor 63–C10 is used to phase shift the reference winding voltage by about 90°, which is necessary for the proper operation of the two phase servo motor. Resistor 63–R27 provides AC feedback from the secondary of 63–T1 to the emitter of 63–Q3. This not only stabilizes the gain of the last four stages of the amplifier, but also has the effect of lowering the output impedance of the amplifier. This increases the damping applied to the servo motor 15 and tends to prevent oscillation and overshoot. A decoupling network consisting of 63–R28 and 63–C4 is used to prevent oscillation in the amplifier and to provide increased filtering of the 28 v. DC supply for the first three stages.

In operation the two lateral edges of the web 13 to be monitored are interposed between the retro-reflective surface 17 and the respective sensing heads 11, 11'. As long as the web edges remain in position such that the amount of light reflected to the photocells 58 of the respective sensing heads maintains the resistance of the associated photocell as a value which keeps the associated bridge 60 in balance, there is no output from either of the bridges to their associated servo amplifiers 63. The system is usually adjusted so that the line of light image from the sensing head is equally divided between the web and the retro-reflective tape. If either web edges moves away from this position in either direction, the bridge 60, associated with the sensing head monitoring that edge, becomes unbalanced because of a change in the photocell resistance. This unbalance results in an input signal to the associated servo amplifier 63. The output voltage of the bridge 60, which provides the input signal to the servo amplifier 63, is phased according to the direction of unbalance, so that the output from a unbalance occasioned by an increase in photocell resistance, produced by less light being reflected to the photocell, is opposite in phase by 180° to outputs caused by a decrease in photocell resistance, resulting from more light being reflected to the photocell. The output from bridge unbalance is fed by lead 62 to the associated servo amplifier 63, where it is amplified and fed to the control winding of the associated servo motor 15. The servo motor 15 is driven by this signal in a direction determined by the phase of the signal. By proper hook-up of the outputs of servo amplifiers 63 to the servo motor control windings, a decrease in light reflected to either of the photocells 58, caused by the web edge moving in a direction which progressively cuts off more of the light beam striking the retro-reflective surface, results in servo motor rotation which moves the sensing head coupled thereto in the same direction in which the web edge is progressing. Concurrent movement of the wiper or moving contact of the servo potentiometer 16 coupled to that servo motor is also effected. This motion continues until the correct amount of the light beam is being retro-reflected to the photocell and the associated bridge 60 returns to null or balance condition. If the web edge moves in the opposite direction from the substantially longitudinally centered normal position along the line of light image, the increase of light reflected to the photocell resulting from the edge moving in a direction to expose more of the light beam to the retro-reflective surface 17 results in servo motor rotation in the opposite direction and the sensing head is driven in the direction of movement of the web edge, or toward the center of the rail until the web edge is again longitudinally centered along the line of light image and the bridge is returned to a balanced condition.

The servo potentiometers 16 which are each formed of a variable resistance element such as a slide wire or multi-turn potentiometer, also follow the servo motor rotation and sensing head position, since they are mechanically linked to the servo motors. The total resistance of each of the servo potentiometers 16 is chosen so as to be compatible with the read-out device 65 and so that a known voltage may be impressed across the total resistance, such that the sliding contact connected to the read-out device input will pick off a voltage which bears a direct relationship to the linear position of the sensing head. The read-out device 65, as previously mentioned, converts this voltage to a direct indication of linear position of the sensing head or sensing heads. It will be appreciated that control of web position or width may also be achieved by conventional means responsive to the signals supplied by the sliding contacts of the servo potentiometers 16 to initiate control means for width adjustment or web positioning.

By the arrangement herein described, wherein the sensing heads each emit a line of light, preferably approximately one-half inch long by one-thirty-second inch wide at the plane of the web, gradual transitions from light to dark are achieved as the web edge position moves from its substantially longitudinally centered position along the line of light image, minimizing "hunting" or oscillation of the sensing head and permitting operation at high gain or high sensitivity. If only a small spot of light were imaged by the sensing heads at the zone of the web edge, this would result in a fast change from light to dark resistance of the photocell as the web edge position varied or as the sensing head moved to restore balance in the associated bridge. This could result in a continual "hunting" action in the servo mechanism resulting from such abrupt changes. The imaging of a line of light in the zone of each of the web edges extending perpendicular to the direction of travel of the web along the web path, together with the retro-reflective surface, allows gradual transition from light to dark resistance of the photocell, or vice versa, and permits approach to null position with a gradually decreasing resistance differential in the photocell, thus minimizing such hunting action.

While the foregoing description has been directed to a dual position configuration, wherein a pair of sensing heads and associated circuitry are employed, it will be apparent that where it is desired to monitor the width or position of only one edge of a web, a single sensing head with the supporting and driving structure and associated circuitry for only one sensing head may be employed.

An optional meter recorder read-out unit 70, which may be used with the web width monitor is illustrated in FIGURE 8. The operation of this unit is like the digital voltmeter model as far as the servo positioning system is concerned. However, there are some changes in the read-out circuitry. In this meter-recorder unit system, the range of measurement is usually suppressed. Instead of 0–100 inches, full scale usually covers about 10 inches, 54 to 64 inches being a common range. The meter read-out is a relay type meter 71, which is used to actuate two control relays, 70–RE1, 70–RE2, through suitable transistor circuitry, including transistor 70–Q1, 70–Q2. Transistors 70–Q1, 70–Q2 are used because the meter relay contacts are designed for low voltage and current. The recorder 72 includes a conventional synchro receiver which drives a chart paper mechanism (not shown). A synchro transmitter 73 is connected to a measuring roll 74 and causes the synchro receiver through suitable gearing to turn the chart drive as the cloth moves. The result is a recording which gives the width and length of the cloth. The piece of chart paper is usually torn off and sent along with the piece of cloth. This is very useful to the customer when laying out the cloth. Operation of this model is as follows:

The servo potentiometers for the left and right web edges, here indicated at 16a, 16a', are each formed of a voltage divider adjusted so that 2.7 v. DC appears on the slider of each servo potentiometer for a piece of cloth 54 inches wide centered up under the sensing heads 11, 11'. These two voltages when added produce 5.4 volts for the 54 inch wide piece of cloth. Another equal voltage of opposite polarity from the range adjustment potentiometer 75 is used to buck the 5.4 v. DC to zero. This causes the output to the operational amplifier 76 to be zero, as there is no input signal. The meter 71 and the recorder 72 will be at zero, which is calibrated to be 54 inches. When the cloth is 64 inches wide, the voltage of the sliders will be 3.2 v. DC. The sum of these voltages will be 6.4 v. DC. The difference between the bucking voltage of 5.4 v. DC and 6.4 v. DC will be 1 v. DC. This makes the effective input voltage of the amplifier 76 to be 1 v. DC, which produces an output voltage of 5 v. DC as the amplifier has a gain of five. This 5 v. DC produces full scale deflection of both the meter 71 and the recorder 72 when the calibration potentiometers are properly adjusted. The meter 71 is a relay type having adjustable high and low contacts which are used to actuate the two control relays, 70–RE1, 70–RE2, through the circuitry of transistors 70–Q1, 70–Q2. One is used as the wide limit and the other as the narrow limit control. Diodes are used across the meter 71 to protect it from overloads caused by cloth not being in the 54 to 64 inch wide range or no cloth at all in the system. Operation of the system has been described with the cloth centered under the sensing heads. However, if the cloth is not centered, the sum of the two voltages will be 5.4 v. DC and 6.4 v. DC for 54 and 64 inch cloth and the output of the amplifier 76 will still be 5 v. DC when the cloth changes from 54 to 64 inches in width.

Instead of having the multi-turn wrap of the drive cable 36 around the driving drum 22 and the anchoring of the cable to the drum, a chain and sprocket drive, not shown, may be employed for the cable 36, wherein a sprocket is substituted on the servo motor shaft 21 for the drum 22. When such a sprocket is used, the drive cable 36 is interrupted in the region of the sprocket by a section of sprocket chain to be meshed with the sprocket, secured at one of its opposite ends to the cable portion in the upper compartment 18 between the sprocket and trolley 27 and at its other end to the cable portion in lower compartment 19 between the sprocket and trolley 26. The length of the drive chain is sufficient to remain meshed with the sprocket throughout the full desired range of movement of the sensing head.

The above-described web width monitor system is capable of use with fast moving webs without the complicated optics of other fast response systems, and can adapt to wide variations in the width of the material to be monitored without any adjustments in the mechanism other than a change in the high and low control limits in accordance with the nominal width of the web material. Further, the monitoring system using retro-reflective material and angularly adjustable sensing heads, facilitates use of the monitor on open weave material, such as screen wire and the like. The heads 11, 11' are each adjustable through at least about 180°, in a plane perpendicular to the axis of head travel.

The retro-reflective surface may be positioned in relation to the head so that the angle of incidence of the light beam on the reflective surface is any angle up to 60° off the normal, with little effect on the efficiency of the system. The shadow effect of the basic elements from which the moving web or cloth is fabricated thus provides a real differential in reflected light as the angle of incidence is varied from the normal.

While but one particular embodiment has been specifically shown and described, it is apparent that various modifications may be made therein within the spirit and scope of the invention, and it is desired therefore that only such limitations be placed on the invention as are imposed by the prior art and set forth in the appended claims.

We claim:

1. A web monitor for continuously measuring the width of a web moving along a web transport path, comprising a sensing head located adjacent the lateral edge of the web, said sensing head including light source means for illuminating an inspection zone intercepted by the associated web edge and light sensing photo-electric means responsive to light reflected from said zone, a trolley for the scanning head, rail means overlying the web transport path defining a first rectilinear track transversely spanning the web supporting said trolley for to-and-fro movement transversely of the web along said track, servo motor means at a fixed station adjacent a first end of said track for driving the trolley along said track, a pulley device at a fixed station intermediate the ends of said rail means, circuit means responsive to output signals from said photoelectric means for activating said servo motor means in extent and direction to drive said trolley to positions locating said sensing head in preselected positional relation to the associated web edge upon deviation of the web edge from such preselected relation, said rail means including a second track paralleling said first track, a roller carriage supported for movement along said second track and having plural pulleys thereon, electrical conductor means for conducting electric current having a stationary section extending from adjacent said servo motor means along said second track to a fixed point for a distance at least as great as the range of travel of said carriage and a movable section extending long said second track from said fixed point about a pulley of said carriage and said pulley device and extending along said first track to said sensing head, and drive cable means driven by said servo motor means having portions coupled to said trolley and to said carriage to drive said trolley and to correlate movement of the carriage in opposite relation to the trolley to maintain said electrical conductor means taut for all positions of the sensing head.

2. Apparatus as defined in claim, wherein said rail means has an intermediate horizontal partition therein defining an upper compartment and a lower compartment each of substantially rectangular cross-section and each extending substantially the length of the rail means, said rail means having an elongated slot in the bottom thereof bounded by coplanar flanges defining said first track, said partition defining said second track, and said carriage and said trolley being respectively located in said upper and lower compartments, said trolley having support means depending through said slot and connected to said scanning head to support the latter therefrom.

3. Apparatus as defined in claim 1, wherein said drive cable means has a first cable portion extending from said servo motor means along said second track and about a pulley of said carriage and returning to a fixed anchor point adjacent said servo motor means and a second cable portion extending from said servo motor means along said first track and about said pulley device and along said second track to said carriage where the same is trained about a pulley of said carriage and returns along said second track to a stationary anchor point adjacent said pulley device, said second cable portion being connected to said trolley for driving the latter.

4. Apparatus as defined in claim 3, wherein said rail means has an intermediate horizontal partition therein defining an upper compartment and a lower compartment each of substantially rectangular cross-section and each extending substantially the length of the rail means, said rail means having an elongated slot in the bottom thereof bounded by coplanar flanges defining said first track, said partition defining said second track, and said carriage and said trolley being respectively located in said upper and lower compartments, said trolley having support means depending through said slot and connected to said scanning head to support the latter therefrom.

5. Apparatus as defined in claim 4, wherein said stationary section of said electrical conductor means lies against said partition in said upper compartment and is anchored thereto adjacent said pulley device, and said movable section joins said stationary section thereat by a recurved bend and includes a first portion extending through said upper compartment alongside said stationary section to said carriage where the same is trained about a pulley of said carriage and a second portion extending therefrom to and about said pulley device and continuing through said lower compartment to a location adjacent said trolley and scanning head for connection to the scanning head.

6. A web width monitor for continuously measuring the width of a web moving along a web transport path, comprising first and second sensing heads located adjacent the respective opposite lateral edges of the web, said sensing heads each including light source means for illuminating an inspection zone intercepted by the associated web edge and light sensing photoelectric means responsive to light reflected from said zone, a trolley for each of the scanning heads, an elongated rail member transversely spanning the width of said web having two aligned rail sections including means extending from each end thereof to adjacent the longitudinal center of the rail member providing first rectilinear tracks above each web edge supporting the respective trolleys for to-and-fro movement transversely of the web along said tracks, servo motor means at a fixed station adjacent each end of said rail member for driving the respective trolleys along said track, circuit means responsive to output signals from said photoelectric means for activating said servo motor means in extent and direction to drive said trolleys to positions locating said sensing heads in preselected positional relation to the associated web edge upon deviation of the web edge from such preselected relation, said rail member including second tracks paralleling the respective first tracks, a roller carriage associated with the respective scanning heads supported for movement along each of said second tracks and having plural pulleys thereon, an idler pulley adjacent the center of said rail member, electrical conductor means for each rail section for conducting electric current having a stationary section extending from the respective servo motor means along the respective second tracks to a fixed point adjacent the center of said rail member and a movable section extending along the respective second tracks from said fixed point about a pulley of said carriages associated with the respective scanning heads and said idler pulley and extending along said first tracks to the associated sensing head, drive cable means for each rail section driven by the respective servo motor means having portions coupled to the associated trolley and to the associated carriage to drive the trolley and to correlate movement of the carriage in opposite relation to the trolley to maintain said electrical conductor means taut for all positions of the sensing heads, and electrical circuit means responsive to the locations of the pair of sensing heads along the rail member to indicate the width of the web.

7. Apparatus as defined in claim 6, wherein said last-mentioned electrical circuit means includes a pair of potentiometer means coupled respectively with said servo motor means having movable contact members positioned thereby to provide voltages at said contact members indicative of the positions of said sensing heads and means collectively responsive to said voltages to continuously indicate the width of the web.

8. Apparatus as defined in claim 6, wherein each section of said rail member has an intermediate horizontal partition therein defining an upper compartment and a lower compartment each of substantially rectangular cross-section and each extending substantially the length of the rail section, said rail member having an elongated slot in the bottom thereof bounded by coplanar flanges defining said first tracks, said partition defining said second tracks, and said carriages and said trolleys being respectively located in said upper and lower compartments, said trolleys having support means depending through said slot and connected to the respective scanning heads to support the latter therefrom.

9. Apparatus as defined in claim 8, wherein said stationary section of said electrical conductor means for each rail section lies against said partition in said upper compartment and is anchored thereto adjacent said stationary pulley means, and said movable section joins said stationary section thereat by a recurved bend and includes a first portion extending through said upper compartment alongside said stationary section to the associated carriage where the same is trained about a pulley of said carriage and a second portion extending therefrom to and about said idler pulley and continuing through said lower compartment to a location adjacent the associated trolley and scanning head for connection to the scanning head.

References Cited

UNITED STATES PATENTS 2,674,151  4/1954  Garrett et al. _____ 250—219 X
3,345,835  10/1967  Nickell et al. _____ 66—166

ARCHIE R. BORCHELT, Primary Examiner

T. N. GRIGSBY, Assistant Examiner

U.S. Cl. X.R.

66—166; 250—202, 219; 356—159